(No Model.)
R. E. TILTON.
TRACTION WHEEL.
No. 266,924. Patented Oct. 31, 1882.
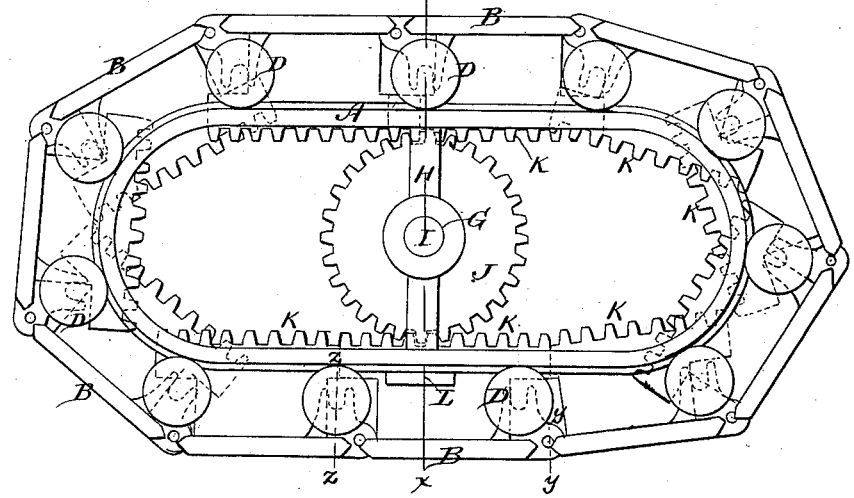
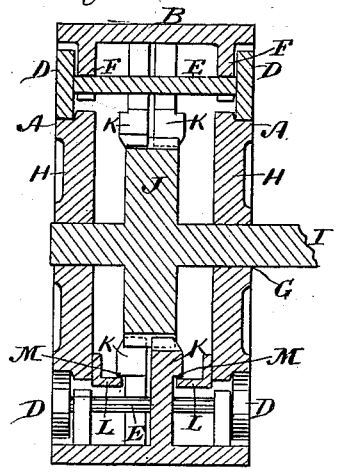
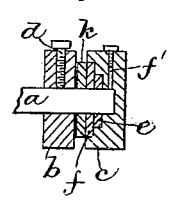
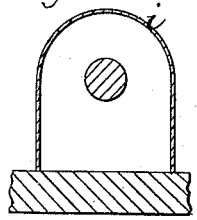
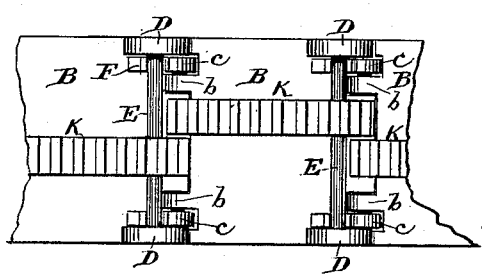
Witnesses:
Joseph Cutter
A. L. White
Inventor:
R. E. Tilton
by Wright & Brown
Attys
N. PETERS, Photo-Lithographer, Washington, D. C.

United States Patent Office.

RUFUS E. TILTON, OF BROCKTON, MASSACHUSETTS.

TRACTION-WHEEL.

SPECIFICATION forming part of Letters Patent No. 266,924, dated October 31, 1882.

Application filed July 21, 1882. (No model.)

*To all whom it may concern:*

Be it known that I, RUFUS E. TILTON, of Brockton, in the State of Massachusetts, have invented certain Improvements in Traction-Wheels, of which the following is a specification.

This invention relates to that class of traction-wheels having elliptical tracks, and a sectional tire or periphery composed of plates pivoted together and provided with friction-rollers running upon the elliptical tracks. The invention has for its object to provide certain improvements in a wheel of this class, whereby simplicity of construction, ease of operation, and other desirable results are obtained, as I will now proceed to describe.

Of the accompanying drawings, forming a part of this specification, Figure 1 represents a side elevation of a wheel embodying my invention. Fig. 2 represents a transverse section on line $x\ x$, Fig. 1. Fig. 3 represents a view of the inner surfaces of several of the plates or tire-sections. Fig. 4 represents a section on line $y\ y$, Fig. 1. Fig. 5 represents a section on line $z\ z$, Fig. 1. Fig. 6 represents a section on line $x'\ x'$, Fig. 5.

The same letters of reference indicate the same parts in all the figures.

My improved wheel is composed essentially of two elliptical tracks, A A, rigidly secured to each other, a tire composed of a series of metal plates, B B, pivoted together end to end, and friction-rollers D, bearing on the tracks A A and set on arbors E, which are journaled in ears or lugs F on the plates B, each plate having a pair of rollers, D. The tracks A A have flanges at their inner ends, which prevent the rollers from being displaced laterally.

It will be seen that when power is applied to move the wheel the plates B and their rollers travel around upon the tracks A A, said plates presenting an extended bearing to the ground or other surface upon which they travel, and thus giving the wheel the desired traction.

The wheel, when used in connection with a vehicle to be drawn by draft animals, will be connected with the body of the vehicle in any suitable manner, preferably by the entrance of one of the axles of the vehicle into sockets or bearings G in cross-bars H, rigidly attached to the track A, it being understood that two or more of the improved wheels will be employed, as in ordinary vehicles.

When the wheel is to be driven by power generated on the vehicle, as in a steam road-engine, suitable means are employed to apply the power to the sectional tire. The best means of which I am aware are those shown in the drawings, and consisting of a shaft, I, journaled in the bearings G, and adapted to be rotated by the prime motor, a cog-wheel, J, fast upon said shaft between the tracks A A, and a series of racks, K, attached to the inner surfaces of the plates B and meshing with the cog-wheel J, each plate having its own rack, which is independent of the racks of the adjoining plate. The racks are not arranged in line, but each is set so that its ends will lap by the ends of the adjacent racks, to enable the plates to assume the necessary angles to each other in passing around the rounded portions of the tracks, as shown in Fig. 3. The lower portions of the tracks A A are provided with lugs L L, which project under shoulders M, formed on the racks K, and prevent the racks and their plates from pulling away from the cog-wheel when the central part of the wheel is over a hollow or depression in the road, or when the wheel is raised at one end of its major axis by an obstruction, so that the plates B at the bottom of the wheel are without support from below.

It will be seen that the rotation of the shaft I will, through the cog-wheel J and racks K, cause the plates B to travel upon the tracks, and thus propel the vehicle. I do not limit myself, however, to the cog-wheel and racks as a means for driving the plates B.

If desired, an endless driving-chain may be passed from a driving-shaft over the plates B, the latter being grooved in their exterior surfaces to receive the chain and prevent it from coming in contact with the ground, and provided with sprocket-teeth to engage with the links of the chain.

My improved wheel is adapted for use on vehicles to be driven over sandy roads, and for road-engines or other vehicles to be driven by steam on ordinary roads.

The rods or pivots $a$, which pass through ears $b\ c$ on the proximate ends of the plates B B, are rigidly attached to the ears $b$ by set-screws $d$ or other suitable means and journaled in the ears $c$, To prevent the access of sand, &c., to the journaled portions of the pivots $a$, I allow said pivots to project only partially through the ears $c$, so that their outer ends are covered by said ears, as shown in Fig. 4. I also provide stuffing-boxes, formed by recessing the inner surfaces of the ears $c$, placing packings $e$ in said recesses, and covering said packings by plates $f$, bolted to the inner faces of the ears $c$. Washers $k$ are preferably interposed between the lugs $b\,c$. Each ear $c$ has an oil-channel, $f'$, to admit oil to the bearing of the pivot, said channel being closed by a screw-plug, excepting when oil is being inserted. I prefer to provide the lugs F, in which the roller-arbors E are journaled, with similar stuffing-boxes and oil-channels, as shown in Fig. 5. I also prefer to incase the arbors E between the lugs F F by a sheet-metal casing, $i$, as shown in Figs. 5 and 6, so that sand and dirt cannot obtain access to the bearings of the arbors E at the inner sides of the lugs F.

I claim—

1. In a traction-wheel, the combination of the sectional tire composed of jointed flat plates B, placed end to end, the rollers D, journaled in lugs on the inner surfaces of said plates, and the flanged elliptical tracks A, adapted to be attached to the vehicle to which the wheel pertains, and supporting said rollers and tire, so as to give the latter an elongated continuously-supported flat bearing on the ground, as set forth.

2. In a traction-wheel, the combination of the flanged tracks A, the sectional tire composed of flat plates pivoted together end to end, surrounding said tracks and adapted to bear on the surface over which the wheel travels, the racks K, attached to said plates, the interposed rollers D, and the shaft I, having the cog-wheel J, meshing with said racks and propelling the tire, as set forth.

3. The combination of the tracks A, having the lugs L L, the cog-wheel J, the plates B, and the racks K, attached to said plates and supported, as described, by the lugs L L.

4. The combination of the plates B B, the pivots $a$, and the ears $b\,c$ on the proximate ends of said plates, the ears $b$ being rigidly attached to the pivots, and the ears $c$ being journaled on said pivots and formed to cover the outer ends thereof, and provided with stuffing-boxes at their inner sides, as set forth.

5. The combination of the plates B, the lugs F, the roller-arbors E, journaled in said lugs, the casing $i$, and the stuffing-boxes, whereby the bearings of the shafts E are protected, as set forth.

In testimony whereof I have signed my name to this specification, in the presence of two subscribing witnesses, this 14th day of July, in the year 1882.

RUFUS E. TILTON.

Witnesses:
CHAS. W. SUMNER,
CHAS. H. REED.